United States Patent
Cornell et al.

[11] 3,924,410
[45] Dec. 9, 1975

[54] HYDROSTATIC TRANSMISSION CONTROL SYSTEM

[75] Inventors: Charles R. Cornell; Dennis D. Simpson; Kenneth K. Knapp, all of Battle Creek, Mich.

[73] Assignee: Eaton Corporation, Cleveland, Ohio

[22] Filed: Oct. 2, 1974

[21] Appl. No.: 511,212

[52] U.S. Cl. .................. 60/403; 60/444; 60/445; 60/468; 60/490
[51] Int. Cl.[2] .................. F15B 20/00; F16H 39/46
[58] Field of Search ............ 60/403, 406, 443, 444, 60/445, 468, 487, 488, 490; 91/459, 461; 251/30, 31

[56] References Cited
UNITED STATES PATENTS

| | | | |
|---|---|---|---|
| 3,186,310 | 6/1965 | Neff et al. | 60/443 X |
| 3,795,109 | 3/1974 | Bojas et al. | 60/490 |
| 3,800,535 | 4/1974 | Ward et al. | 60/445 X |

*Primary Examiner*—Edgar W. Geoghegan
*Attorney, Agent, or Firm*—Teagno & Toddy

[57] ABSTRACT

An improved hydrostatic transmission control system includes two pilot valves which are selectively operable to perform the dual functions of (1) effecting actuation of a main control valve from a neutral position to either one of two actuated positions to port fluid to vary the displacement of the hydrostatic transmission and (2) effecting a change in the rate at which fluid is ported and the displacement of the hydrostatic transmission is varied. When the displacement of the hydrostatic transmission is to be increased, a first one of the pilot valves is actuated to effect operation of the main control valve from the neutral position to a first actuated position in which fluid is ported to a swashplate motor to effect an increase in the displacement of the hydrostatic transmission. If a relatively large increase is to be made in the displacement of the hydrostatic transmission, the second pilot valve is also actuated to increase the rate of fluid flow between the main control valve and the swashplate motor. When the displacement of the hydrostatic transmission is to be decreased, the second pilot valve is actuated to effect operation of the main control valve from the neutral position to a second actuated position in which fluid is ported to the swashplate motor to effect a decrease in the displacement of the hydrostatic transmission. If a relatively large reduction is to be made in the displacement of the hydrostatic transmission, the first pilot valve is also actuated to increase the rate at which fluid is conducted between the main control valve and the swashplate motor. A control circuit for effecting operation of the two pilot valves to either increase or decrease the displacement of the hydrostatic transmission in response to a command signal includes a time delay circuit to effect sequential operation of the two pilot valves when a relatively large change is to be made in the displacement of the hydrostatic transmission.

32 Claims, 5 Drawing Figures

3,924,410

HYDROSTATIC TRANSMISSION CONTROL SYSTEM

BACKGROUND OF THE INVENTION

This invention relates generally to an improved hydrostatic transmission control system and more specifically to a hydrostatic transmission control system which is operable to effect a variation in the displacement of the hydrostatic transmission and a change in the rate at which the displacement of the hydrostatic transmission is varied.

A known control system for varying the displacement of a hydrostatic transmission is disclosed and claimed in U.S. Pat. application Ser. No. 446,658, filed Feb. 28, 1974, by Kenneth K. Knapp and Charles R. Cornell, and entitled "Hydrostatic Transmission Control System." This control system includes a main control valve, two pilot valves and a rate control valve. The two pilot valves are utilized to effect actuation of the main control valve to either increase or decrease the displacement of the hydrostatic transmission. The rate control valve is operable to change the rate at which the displacement of the hydrostatic transmission is varied once the main control valve has been actuated. Although this control system is, to a greater or lesser extent, generally satisfactory in its mode of operation, the use of four valves tends to increase the cost of the hydrostatic transmission control system. Of course, in order to be commercially competitive with other known hydrostatic transmission control systems, it is desirable to minimize the number of valves utilized in the control system.

Two other known control valve assemblies are disclosed in U.S. Pat. Nos. 3,129,645 and 2,891,516. It should be noted that neither of these patents contemplate the utilization of the valve assembles shown therein in association with a hydrostatic transmission. In addition, it should be noted that in U.S. Pat. No. 3,129,645 a plurality of single acting solenoids are utilized to effect operation of a main control valve to vary the rate of fluid flow to a motor. The main valve spool of this known valve assembly must be moved in order to vary the rate of operation of the fluid motor. Therefore this known valve assembly is ineffective to vary the rate of operation of the motor when the main control valve is in a steady state operating condition. Still other known control valve assemblies are disclosed in U.S. Pat. Nos. 3,589,242; 3,499,284; and 2,307,544.

SUMMARY OF THE PRESENT INVENTION

The present invention is directed to a control system for varying the effective displacement of one or more units of a hydrostatic transmission. The control system includes a main control valve which is operated from a neutral position to either one or two actuated positions to either increase or decrease the displacement of an associated unit of a hydrostatic transmission. Two pilot valves are selectively operated to effect actuation of the main control valve to a selected one of the actuated positions. In addition, the two pilot valves are selectively operable to vary the rate at which fluid is ported by the main control valve.

When the main control valve is to be actuated to increase the displacement of the hydrostatic transmission, a first pilot valve is actuated. Actuation of the first pilot valve effects a shifting of a main valve spool from a neutral position to a first actuated position in which the main valve spool ports fluid to effect operation of an actuator assembly to increase the displacement of the hydrostatic transmission. If a relatively large change is to be made in the displacement of the hydrostatic transmission, a second pilot valve is actuated to effect an increase in the rate at which fluid is ported between the main control valve and the actuator assembly.

When the displacement of the hydrostatic transmission is to be decreased, the second pilot valve is actuated to effect movement of the main valve spool from the neutral position to a second actuated position in which the main control valve ports fluid to effect operation of the actuator assembly to decrease the effective displacement of the hydrostatic transmission. If a relatively large reduction is to be made in the displacement of the hydrostatic transmission, the first pilot valve is actuated to increase the rate at which fluid is ported between the main control valve and the actuator assembly to thereby increase the rate of operation of the actuator assembly to quickly effect the desired reduction in the displacement. Thus, each of the pilot valves can be utilized to either effect operation of the main control valve or to effect a change in the rate at which fluid is ported by the main control valve.

Since the two pilot valves perform dual functions, it is desirable to effect sequential operation of the pilot valves. Accordingly, a control circuit for effecting actuation of the pilot valves is provided with a time delay feature so that a predetermined time period will elapse between initiation of actuation of one of the pilot valves and initiation of actuation of the other pilot valve. This ensures that operation of the main control valve from the neutral condition will at least have been initiated prior to actuation of a second pilot valve. Since the control system utilizes only two pilot valves in association with one main control valve to effect operation of an actuator assembly to either increase or decrease the displacement of the hydrostatic transmission and to control the rate at which the displacement of the hydrostatic transmission is varied, the cost of the control system tends to be minimized.

Accordingly, it is an object of this invention to provide a new and improved hydrostatic transmission control system in which a pair of pilot valves are utilized to perform the dual functions of effecting a change in the displacement of the hydrostatic transmission and varying the rate at which the displacement of the hydrostatic transmission is changed.

Another object of this invention is to provide a new and improved hydrostatic transmission control system in accordance with the next preceding object and wherein a control circuit prevents operation of either of the pilot valves until a predetermined time period has elapsed after initiation of operation of the other of the pilot valve to thereby provide for sequential operation of the pilot valves.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

First Embodiment of the Invention

Figure 1:
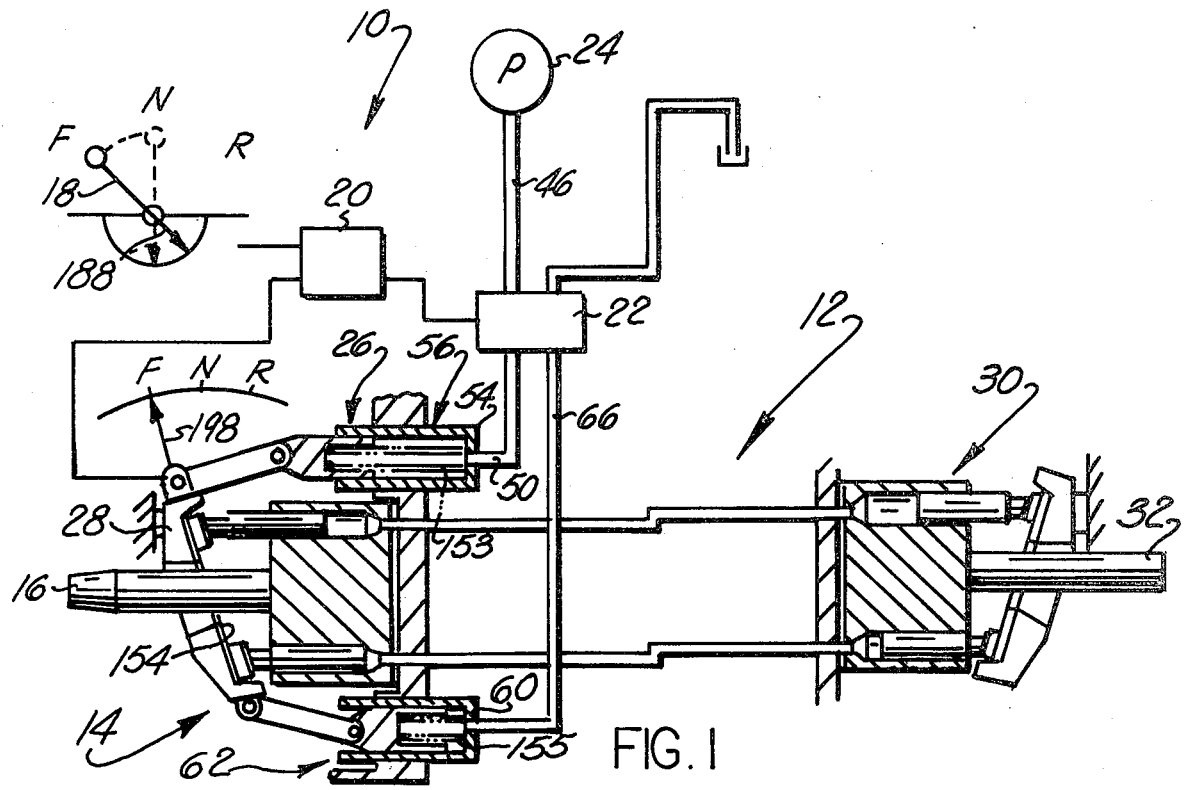
FIG. 1 is a schematic illustration of a hydrostatic transmission having a control system constructed in accordance with the present invention.

A control system 10 constructed in accordance with the present invention is illustrated in FIG. 1 in association with a hydrostatic transmission 12 having a variable displacement pump unit 14 with an input shaft 16 which is driven at a substantially constant speed by a prime mover. To initiate a change in the displacement of the pump unit 14, a control handle 18 is moved. Upon movement of the control handle 18, electrical control circuitry 20 is activated to effect operation of an improved control valve assembly 22 to port fluid from a pump 24 to an actuator assembly 26. Operation of the actuator assembly 26 moves a swashplate 28 to vary the displacement of the pump unit 14 and the rate at which fluid is transmitted to a fixed displacement motor 30 to thereby vary the speed at which an output shaft 32 is driven relative to the speed at which the input shaft 16 is driven by the prime mover. Under low or no-load operating conditions, the output speed of the hydrostatic transmission 12 will vary as a direct function of variations in the displacement of the pump unit 14.

In accordance with one feature of the present invention, the control valve assembly 22 includes only three valves, that is a main control valve 36 (see FIG. 2) and two pilot valves 38 and 40. Actuation of the first pilot valve 38 effects leftward movement (as viewed in FIG. 2) of a main valve spool 44 to port fluid under pressure from an input conduit 46 through a valve passage 48 to a conduit 50. The conduit 50 is connected in fluid communication with the top cylinder 54 (FIG. 1) of a first swashplate motor 56 in the actuator assembly 26. In addition, movement of the main control valve spool leftwardly from the neutral position illustrated in FIG. 2 to a forward actuated position results in the bottom cylinder 60 (FIG. 1) of a second swashplate motor 62 being connected with drain through a conduit 66 and a second passage 68 (FIG. 2) in the main valve spool 44.

When the main valve spool 44 is in the leftward or forward actuated position, the passage 68 is effective to port fluid from the swashplate motor 62 to a passage 72 which is connected by a passage 74 with a passage 76 in the main valve spool 44. The passage 76 is connected in fluid communication with a restricted flow conduit 80 which is connected with drain through a restriction or orifice 84. The orifice 84 is sized so that fluid is exhausted from the bottom cylinder 60 (see FIG. 1) of the swashplate motor 62 at a relatively low rate. Therefore, the swashplate motor 56 is operated at a relatively slow rate to accurately position the swashplate 28 in a position corresponding to a desired forward displacement of the unit 14.

When the forward displacement of the pump unit 14 is to be increased by a relatively large amount, it is desirable to increase the rate of operation of the swashplate motor 56 to quickly effect the desired change in displacement. Accordingly, when the displacement of the pump unit is to be changed by a large amount, the second pilot valve 40 is actuated after the main control valve 36 has been shifted to the forward actuated position to thereby port fluid from a bypasses conduit 88 through a valve passage 90 to the drain conduit 92. The resulting parallel flow of fluid through the restricted flow conduit 80 and the bypass conduit 88 enables fluid to be exhausted at a relatively high rate from the bottom piston 60 in the swashplate motor 62. This enables the top swashplate motor 56 to move the swashplate 28 at a relatively high speed to effect an increase in the displacement of the pump unit 14.

Figure 2:
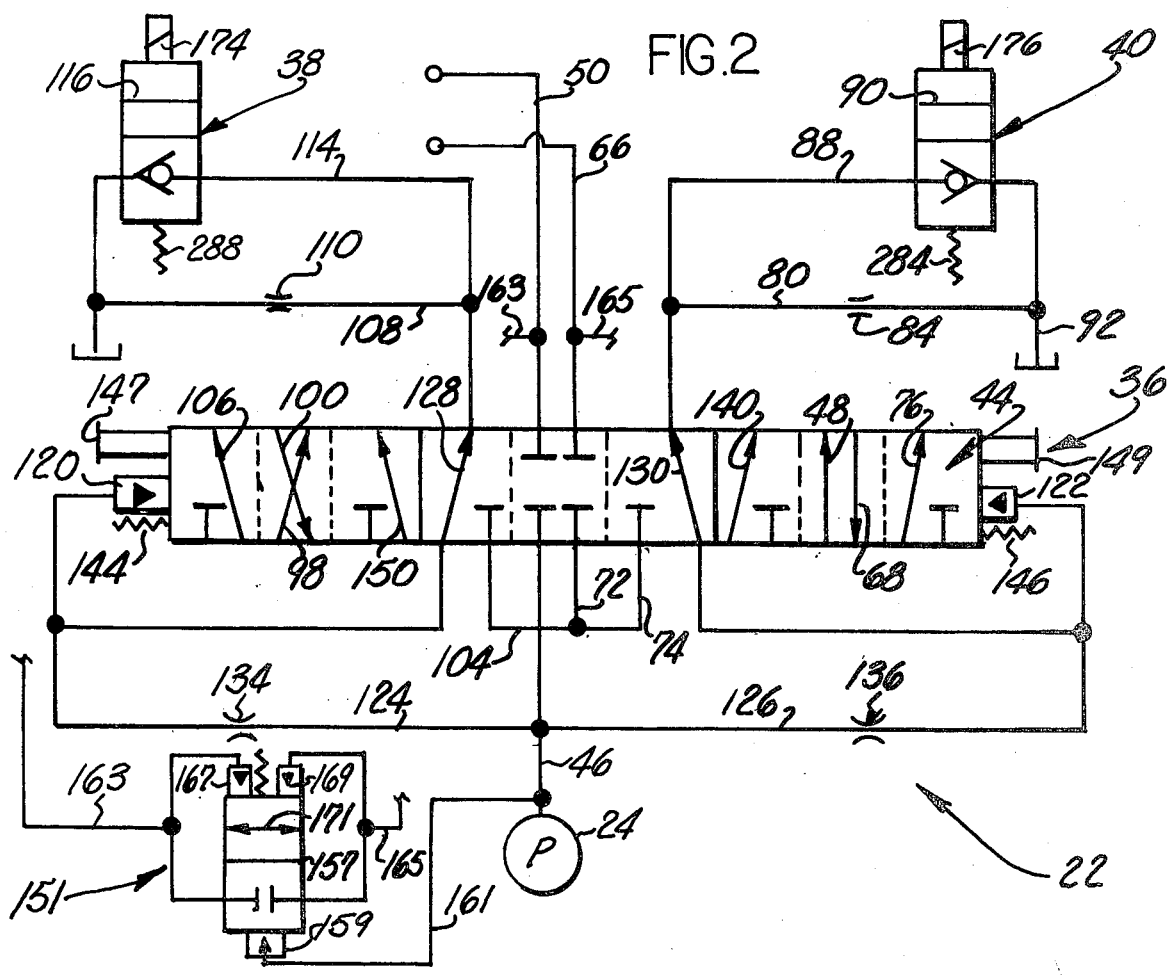
FIG. 2 is a schematic illustration of an improved control valve assembly utilized in the hydrostatic transmission control system of FIG. 1.

When the displacement of the pump unit 14 approaches a desired displacement indicated by the position of the control handle 18, the pilot valve 40 is returned to the unactuated condition shown in FIG. 2 in which fluid flow through the bypass conduit 88 is blocked. Of course, this enables fluid to be exhausted to drain through only the restricted flow conduit 80 and the orifice 84 to thereby reduce the rate of operation of the swashplate motor 56. This enables the swashplate 28 to be accurately moved to a position corresponding to the desired displacement of the pump unit 14. When the pump unit 14 has the desired displacement, the first pilot valve 38 is returned to the unactuated condition of FIG. 2 to thereby effect movement of the main valve spool 44 from the leftward or forward actuated position back to the neutral or initial position illustrated in FIG. 2.

When the displacement of the pump unit 14 is to be reduced from the maximum displacement condition illustrated in FIG. 1, the control handle 18 is pivoted in a clockwise direction from the forward actuated position illustrated in solid lines in FIG. 1 toward the neutral position illustrated in dashed lines in FIG. 1. This causes the electrical control circuitry 20 to effect operation of the second pilot valve 40 (FIG. 2). Operation of the second pilot valve 40 results in movement of the main valve spool 44 from the neutral position illustrated in FIG. 2 to a rightward actuated position. When the main valve spool 44 is in the rightward actuated position, high pressure fluid from the pump 24 is conducted through a valve passage 98 to the conduit 66 leading to the bottom cylinder 60 of the swashplate motor 62. This causes the swashplate 28 to be pivoted in a clockwise direction (as viewed in FIG. 1) to thereby reduce the displacement of the pump unit 14.

As the displacement of the pump unit 14 is being reduced with the valve spool 44 in the rightward actuated position, fluid is exhausted from the top cylinder 54 through the conduit 50 to a passage 100 (FIG. 2) in the main valve spool 44. Fluid from the valve passage 100 is ported to the passage 72 which is connected by a passage 104 with a passage 106 in the main valve spool 44. This passage 106 ports the exhaust fluid to a restricted flow conduit 108 which is connected with drain through an orifice or restriction 110. This results in a relatively low rate of fluid flow from the top cylinder 54 (FIG. 1) of the actuator assembly 26 so that the swashplate motor 62 is operated at a relatively slow speed to facilitate accurate positioning of the swashplate 28.

If the displacement of the pump unit 14 is to be reduced by a relatively large amount from a forward operating condition, the electrical control circuitry 20 effects operation of the pilot valve 38 to connect a bypass conduit 114 with drain through a passage 116 in the pilot valve 38. The resulting parallel flow of fluid through both the restricted flow conduit 108 and the bypass conduit 114 enables fluid to be exhausted at a relatively high rate from the top cylinder 54 of the swashplate motor 56. Therefore, the bottom swashplate motor 62 can move the swashplate 28 at a relatively high speed to quickly reduce the displacement of the pump unit 14.

When the swashplate 14 has been moved to a position approximating the displacement indicated by the position of the control handle 18, the electrical control circuitry 20 effects operation of the pilot valve 38 to the unactuated position shown in FIG. 2 so that fluid flow through the bypass conduit 114 is blocked. Thereafter, fluid can be exhausted at only a relatively slow rate from the top cylinder 54 of the actuator assembly 26. The swashplate motor 62 is then operated at a relatively low speed to accurately position the swashplate 28. When the swashplate 28 has been moved to the position corresponding to the desired displacement, the electrical control circuitry 20 effects operation of the pilot valve 40 back to the initial or normal condition illustrated in FIG. 2 to thereby effect movement of main control valve spool 44 back to the neutral position in which fluid flow through the conduits 50 and 66 is blocked to thereby hydraulically lock the swashplate 28 in the desired position.

The main valve spool 44 is held in the neutral position of FIG. 2 under the influence of fluid pressure in a pair of pressure chambers 120 and 122 disposed at opposite ends of the main valve spool. The pressuure chambers 120 and 122 are connected in fluid communication with the pump 24 through a pair of conduits 124 and 126. When the main valve spool 44 is in the neutral position of FIG. 2, a pair of valve spool passages 128 and 130 connect the pressure chambers 120 and 122 in fluid communication with the restricted flow passages 108 and 80. Therefore when the main valve spool 44 is in the neutral position, there is a limited or pilot flow of fluid from the pump 24 through restrictions 134 and 136 in the conduits 124 and 126 to drain through the main control valve spool 44. The restrictions 134 and 136 are sized so that equal pressures are provided in the pressure chambers 120 and 122 to maintain the valve spool 44 in the centered or neutral position illustrated in FIG. 2. It should be noted that the restrictions 110 and 84 are of a substantially smaller size than the restrictions 134 and 136 so that fluid pressure is maintained in the pressure chambers 120 and 122 when the pilot valves 38 and 40 are unactuated and the main valve spool 44 is in the neutral position.

Upon actuation of the pilot valve 38 with the valve spool 44 in the neutral position illustrated in FIG. 2, the pressure chamber 120 is connected with drain through the bypass passage 114 and the passage 116 in the pilot valve spool. This results in a reduction in fluid pressure in the chamber 120 so that the relatively high fluid pressure in the chamber 122 effects movement of the valve spool 44 to the leftward (as viewed in FIG. 2) actuated position. When the valve spool 44 has been moved to the leftward actuated position, the pressure chamber 120 is connected in fluid communication with the bypass conduit 114 through a valve spool passage 140.

To effect movement of the main valve spool 44 back to the neutral position of FIG. 2, the pilot valve 38 is actuated to block fluid flow through the bypass conduit 114. Since the restriction 110 is of a relatively small size, fluid pressure is quickly reestablished in the chamber 120. The main valve spool 44 is then shifted toward the rignt (as viewed in FIG. 2) under the combined influence of the pressure in the chamber 120 and a biasing spring 144 which was previously held in a compressed condition under the influence of the fluid pressure in the chamber 122. It should be noted that when the valve spool 44 is in the leftward actuated position, a right biasing spring 146 is in a relaxed condition so that upon operation of the pilot valve 38 back to the unactuated condition shown in FIG. 2, the combined influence of the compressed biasing spring 144 and the fluid pressure in the chamber 120 is effective to overcome the fluid pressure in the chamber 122.

When the main valve spool 44 is to be shifted from the neutral position to a rightward (as viewed in FIG. 2) actuated position, the pilot valve 40 is operated to enable fluid to flow from the pressure chamber 122 through the bypass conduit 88 and valve passage 90 to drain. This results in a reduction in the fluid pressure in the chamber 122 so that the relatively high fluid pressure in the chamber 120 shifts the valve spool 44 rightwardly (as viewed in FIG. 2) against the influence of the biasing spring 146 and the relatively low fluid pressure in the chamber 122. When the valve spool 44 has been shifted to the rightward (as viewed in FIG. 2) actuated position, a valve spool passage 150 maintains the pressure chamber 122 in fluid communication with the actuated pilot valve 40 to thereby maintain the fluid pressure in the chamber 122 at a relatively low pressure compared to the pressure in the chamber 120.

When the main valve spool 44 is to be shifted leftwardly from the rightward actuated condition, the pilot valve 40 is returned to the normal or unactuated condition shown in FIG. 2 blocking fluid flow through the bypass conduit 88. This results in a rapid increase in the fluid pressure in the chamber 122. As this occurs, the main valve spool 44 is shifted toward the left (as viewed in FIG. 2) under the combined influence of this fluid pressure and the biasing spring 146.

When the output shaft 32 of the hydrostatic transmission 12 is to be driven in a reverse direction, the swashplate 28 of the pump unit 14 is pivoted in a clockwise direction from the maximum forward displacement position in FIG. 1 through a neutral or minimum displacement position in which a swashplate actuating surface 154 extends perpendicular to a central axis of the input shaft 16 to a reverse actuated position. This movement of the swashplate 28 reverses the direction of fluid to the motor 30 to thereby reverse the direction of operation of the hydrostatic transmission 12.

To effect movement of the swashplate 28 to a reverse operating position, the pilot valve 40 is actuated to effect a shifting of the main valve spool 44 to the rightward actuated position. This ports fluid under pressure through the valve passage 98 (FIG. 2) to the conduit 66 leading to the bottom swashplate motor 62 (FIG. 1) to thereby effect movement of the swashplate 28 in the manner previously explained in connection with a reduction of forward displacement of the pump unit 14. When the reverse operating speed of the hydrostatic transmission 12 is to be reduced, the pilot valve 38 if actuated to effect movement of the main control valve 44 to a leftward (as viewed in FIG. 2) actuated position to thereby port high pressure fluid from the pump 24 through the valve passage 48 to the conduit 50 leading to the top servomotor 56. When the main valve spool 44 is in either the rightward or leftward actuated position, the unactuated one of the two pilots valves 38 or 40 can be actuated to increase the rate at which the reverse operating displacement of the pump unit 14 is changed.

A pair of manual override buttons 147 and 149 are connected with opposite ends of the valve spool 44. If the solenoid valves 38 and 40 should be rendered inoperative due to a power failure. One of the manual override buttons 147 or 149 can be manually actuated to move the valve spool 44 to either a leftward or rightward actuated position. One course this effects a low rate porting of fluid to and from the swashplate motors 56 and 62.

If the charge pump 24 should fail to supply fluid under pressure to the main control valve 36 due to either a failure of the charge pump itself or a rupturing of the conduit 46, a safety control valve 151 (see FIG. 2) is operated to hydraulically interconnect the two conduits 50 and 56 leading to the swashplate motors 56 and 62. Upon being hydraulically interconnected through the safety or secondary valve 151, springs 153 and 155 in the swashplate motors 56 and 62 are effective to move the swashplate 28 to a neutral position in which the reaction surface 154 extends perpendicular to the central axis of the input shaft 16.

The secondary valve 151 includes a valve spool 157 which is held in the position shown in FIG. 2 under the influence of pressure conducted from the conduit 46 to a pressure chamber 159 through a conduit 161. When the valve spool 157 is in the position shown in FIG. 2, it blocks fluid flow through a pair of conduits 163 and 165. However, upon reduction in fluid prssure in the chamber 159, the relatively high fluid pressure in one of a pair of pressure chambers 167 and 169 is effective to move the valve spool 157 downwardly (as viewed in FIG. 2) so that the two fluid conduits 163 and 165 are connected in fluid communication with each other through the valve passage 171. Since the two fluid conduits 163 and 165 are connected with the conduits 50 and 66, the fluid pressures in the cylinders 54 and 60 of the two swashplate motors 56 and 62 are equalized so that the biasing springs 153 and 155 can return the swashplate 28 to the neutral position. It should be noted that when the swashplate 28 is in a position other than the neutral position, only one of the lines 163 or 165 is pressurized while the other line contains fluid at a relatively low pressure.

When the swashplate 28 is in the maximum displacement condition shown in FIG. 1, there is high pressure fluid in the conduit 50. The conduit 163 is then effective to conduct relatively high fluid pressure to the chamber 167. There is relatively low fluid pressure in the conduit 66 so that the conduit 165 is effective to conduct a relatively low fluid pressure to the chamber 169. The pressure chamber 159 has an effective area which is twice as great as the effective area of either the pressure chamber 167 or the pressure chamber 169. Therefore the fluid pressure in the chamber 159 overcomes the fluid pressuure in the chamber 167 when the charge pump 24 is effective to supply high pressure fluid to the main control valve 36.

Upon a failure of the charge pump 24 with the swashplate 28 in the maximum displacement position of FIG. 1 and the main control valve 36 in the centered position of FIG. 2, the reduction in output pressure from the pump 24 is communicated to the pressure chamber 159. This enables the valve spool 157 to be shifted by the pressure in the chamber 167 or spring 170. Upon operation of the valve 151, the relatively high fluid pressure in the swashplate motor cylinder 54 is connected in fluid communication with the swashplate motor cylinder 60. The swashplate motor 62 is then operated under the influence of the resulting increase in fluid pressure in the cylinder 60 and under the influence of the biasing spring 155 to pivot the swashplate 28 in a clockwise direction to the neutral position.

ELECTRICAL CONTROL CIRCUITRY

Figure 3:
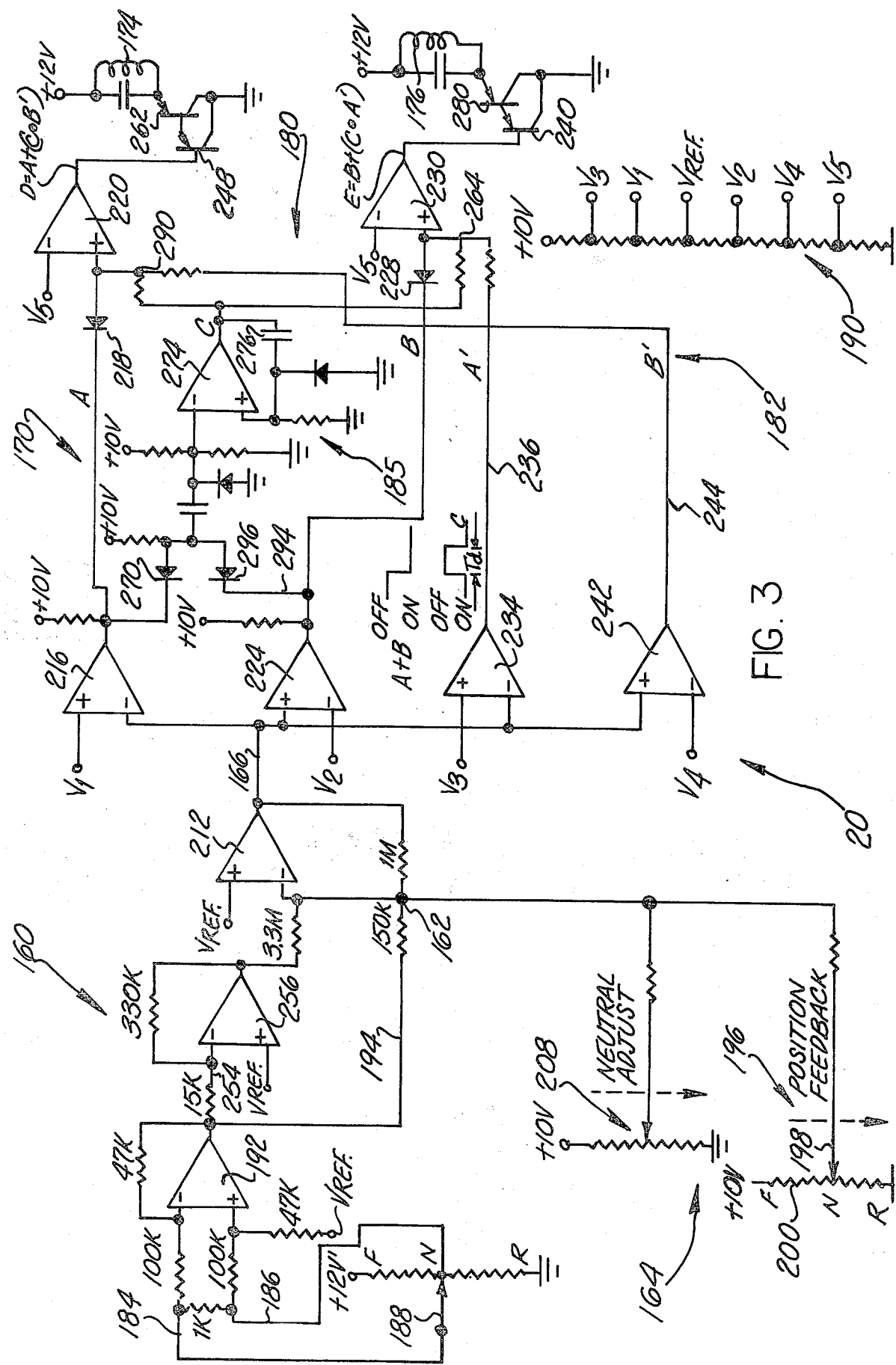
FIG. 3 is a schematic illustration of electrical controls utilized in the hydrostatic transmission control system of FIG. 1.

The electrical control circuitry 20 is illustrated in FIG. 3 and includes command or input circuitry 160 which is effective to provide a command signal indicative of a selected or desired displacement of the pump unit 14. The command signal is transmitted to a summing junction 162 which is connected with position feedback circuitry 164. The position feedback circuitry 164 is effective to provide a feedback signal indicative of the actual displacement of the pump unit 14. If the selected or command displacement is different than the actual displacement of the pump unit 14, an error signal is provided over a lead 166 to valve actuation circuitry 170.

The valve actuation circuitry 170 includes a solenoid 174 for effecting actuation of the pilot valve 38 and a second solenoid 176 for effecting actuation of the pilot valve 40. The valve actuation circuitry 170 includes main control circuitry 180 which is effective to energize one of the two pilot valve solenoid coils 174 or 176 in response to an error signal. Energization of a solenoid coil 174 or 176 effects operation of the main control valve 36 to either the leftward or the rightward actuated condition to thereby effect operation of the actuator assembly 26 to change the displacement of the pump unit 14 to correspond to the displacement indicated by the command signal.

If there is a relatively large difference between the selected displacement indicated by the command signal and the actual displacement indicated by the feedback signal, rate control circuitry 182 is effective to energize the second one of the pilot valves 38 or 40 to effect relatively high speed operation of the actuator assembly 26. A time delay circuit 185 is provided in association with the rate control circuitry 182 to provide a predetermined time period between initiation of operation of one of the pilot valves 38 or 40 by the main control circuitry 180 and the initiation of operation of the other pilot valve under the influence of the rate control circuitry 182. Of course, this is necessary in order to ensure that the main control valve spool 44 is shifted to either a rightward or leftward actuated position in response to operation of one of the pilot valves before the other pilot valve is actuated to effect high speed operation of the actuator assembly 26.

When the pump unit 14 is in a neutral condition having a minimum displacement, the operating surface 154 of the swashplate 28 extends perpendicular to the longitudinal central axis of the input shaft 16. Assuming that the control handle 18 is in the neutral position indicated in dashed lines in FIG. 1, the two input leads 184 and 186 are connected with the same potential. This is because a wiper 188 connected with the handle 18 is in the neutral or common position shown in FIG. 3. It should be noted that if the leads 184 and 186 should be broken, the command signal would appear to be a neutral signal since the same potential would be applied to both leads.

A reference potential obtained from a voltage divider circuit 190 is applied through a resistor to the noninverting terminal of the amplifier 192. Due to the negative feedback associated with an amplifier 192, a signal having a potential equal to the reference potential is transmitted to the summing junction 162 over the lead 194.

The feedback circuit 164 includes a potentiometer 196 having a pointer 198 which is connected with the pump swashplate 28 in the manner illustrated schematically in FIG. 1. The pointer 198 is moved relative to a resistance element 200 to provide a feedback signal which varies as a function of variations in the position of the swashplate 28. Since the displacement of the pump unit 14 varies as a function of variations in the position of the swashplate 28, the feedback signal is indicative of the actual displacement of the pump unit 14. It should be noted that a neutral adjust potentiometer 208 is provided in association with the position feedback potentiometer 196 to enable the potential of the position feedback signal to be adjusted to a potential equal to the reference potential when the pump swashplate is in the neutral position.

When the control handle 18 is in the neutral position and the swashplate 28 is in its neutral position, the error signal transmitted to the valve actuation circuitry 170 will have a potential equal to the reference potential. This is because the reference potential command and feedback signals are transmitted from the summing junction 162 to the inverting terminal of the amplifier 212. The noninverting terminal of the amplifier 212 is connected with reference potential. Due to negative feedback, the error signal from the amplifier 212 will have a potential equal to the reference potential.

The error signal having a reference level potential is applied to the inverting terminal of an amplifier 216. An input potential V1 of a level above the reference level is applied from the voltage divider 190 to the noninverting terminal of the amplifier 216. Therefore the amplifier 216 will have a high potential output signal. This high potential output signal cannot be transmitted through the back poled diode 218 to the amplifier 220. Similarly, a potential V2 of a level below the level of the reference potential is applied to the inverting terminal of an amplifier 224. Therefore the reference potential error signal applied to the noninverting terminal of the amplifier 224 causes it to have an output signal of relatively high potential. A back poled diode 228 prevents this output signal from being transmitted to an amplifier 230.

A signal V3 of a relatively high level above the reference signal level is applied to the noninverting terminal of an amplifier 234. Therfore a relatively high potential signal is transmitted over a lead 236 to the noninverting terminal of the amplifier 230. This causes the amplifier 230 to have an output potential above the potential of the emitter electrode of the PNP transistor 240 so that the solenoid coil 176 remains in a deenergized condition. Similarly, a relatively low potential V4 is applied to the inverting terminal of an amplifier 242 so that a relatively high potential signal is transmitted over the lead 244 to the noninverting terminal of the amplifier 220. Since a relatively low potential V5 is applied to the inverting terminal of the amplifier 220, the amplifier has an output signal of a potential above the potential of an emitter electrode of a PNP transistor 248. Therefore, the pilot valve solenoid coil 174 is maintained in a deenergized condition. Since both of the solenoid valve coils 174 and 176 are deenergized, the pilot valves 38 and 40 remain in the unactuated condition of FIG. 2 and the main control valve 36 remains in the neutral position blocking fluid flow to and from the actuator assembly 26.

When it is desired to increase the output speed of the hydrostatic transmission 12 in a forward direction, the control handle 18 is moved in a counterclockwise direction from the neutral position illustrated in dashed lines in FIG. 1. The moves the wiper 188 upwardly as viewed in FIG. 3 to apply an increasing voltage command signal to the lead 184. The increasing command signal voltage is transmitted to the inverting terminal of the amplifier 192 so that the amplifier has a downgoing output signal which is conducted to the summing junction 162 over the lead 194. At the same time, the downgoing output signal from the amplifier 192 is conducted over a lead 254 to the inverting terminal of a high gain amplifier 256 which quickly becomes saturated. However it should be noted that prior to saturation, the amplifier 256 has an output signal which opposes the output signal of the amplifier 192 to provide a dead zone so that the command or input circuitry 160 does not respond to relatively small changes in the command signal.

Since the control lever 18 was moved through a distance to cause a substantial change in the level of the command signal, the downgoing signal transmitted from the amplifier 192 to the summing junction 162 results in the transmission of a downgoing signal to the inverting terminal of the amplifier 212. The resulting upgoing error signal is transmitted to the inverting terminal of the amplifier 216. The resulting downgoing output signal from the amplifier 216 is transmitted through the diode 218 to the noninverting terminal of the amplifier 220. This causes the output potential of the amplifier 220 to fall below the emitter potential of the PNP transistor 248 to render a second PNP transistor 262 conducting to thereby effect energization of the pilot valve solenoid coil 174.

Energization of the pilot valve solenoid coil 174 actuates the pilot valve 38 to thereby effect operation of the main control valve 36 to the leftward actuated position. As was previously explained, this results in the porting of high pressure fluid through the passage 48 in the main valve spool 44 (see FIG. 2) to the conduit 50 connected with the top cylinder 54 of the actuator assembly 26 (see FIG. 1). The resulting operation of the swashplate motor 56 causes the swashplate 28 to be moved in a counterclockwise direction (as viewed in FIG. 1) to increase the displacement of the pump unit 14.

Assuming the control lever 18 is moved through a relatively small distance so that the command signal corresponds to a relatively small change in the displacement of the pump unit 14, the error signal has a potential level below the potential V3 applied to the noninverting terminal of the amplifier 234. Thereforer, the amplifier 234 continues to have an output potential of a level which is substantially greater than the level of the low potential V5 applied to the noninverting terminal of the amplifier 230. The output amplifier 230 continues to apply to a higher potential to the base of the PNP transistor 240 than the potential of the emitter and the pilot valve solenoid coil 176 remains in a deenergized condition.

If the control handle 18 is moved in a forward direction through a relatively large distance so that a relatively large upgoing error signal is applied to the inverting terminal of the amplifier 234, the resulting downgoing output signal from the amplifier 234 is transmitted over the lead 236 to a summing junction 264. If the signal conducted from the time delay circuitry 186 to the summing junction 264 is at a relatively low potential compared to the reference potential, the amplifier 230 would be effective to apply a relatively low potential to the base of the PNP transistor. The pilot valve solenoid coil 176 would then be energized simultaneously with energization of the pilot valve solenoid 174. Of course, this could result in an indefinite actuation of the main control valve 36 since both of the pressure chambers 120 and 122 would be connected with drain through their respective bypass conduits 114 and 88.

To provide for sequential operation of the pilot valves 38 and 40, the time delay circuitry 186 is effective to transmit a relatively high level signal to the summing junction 264 for a predetermined time period after initiation of energization of the pilot valve solenoid coil 174. To this end, the downgoing signal from the amplifier 216 is transmitted through a back poled diode 270 to the inverting terminal of an amplifier 274 in the time delay circuitry 186. This results in an upgoing output signal from the amplifier 174 for a time period sufficient to charge a condenser 276. The output signal from the amplifier 274 is indicated schematically in FIG. 3. It should be noted that after a predetermined time delay, that is a time period sufficient to enable the condenser 276 to become charged, the output signal from the amplifer 274 becomes downgoing due to the application of a very low potential to the non-inverting terminal of the amplifier. This results in the transmission of a downgoing signal to the summing junction 264.

The downgoing signal from the amplifier 274 is combined with the low level signal from the amplifier 234 at the summing junction 264. The resulting signal is applied to the non-inverting terminal of the output amplifier 230. Thus after a predetermined time period sufficient for the condenser 276 to charge, the amplifier 230 has a downgoing output which is effective to render the transistor 240 conducting to thereby render a second transistor 280 conducting to effect energization of teh pilot valve solenoid coil 276. This results in actuation of the pilot valve 40 a predetermined time period after actuation of the pilot valve 38. Therefore, the pilot valve 38 is effective to cause the main valve 36 to be operated to the leftward actuated condition prior to actuation of the pilot valve 40. As was previously explained, actuation of the pilot valve 40 with the main control valve spool 44 in the leftward actuated position enables fluid to be ported at a relatively high rate through the return passages 68 and 76 of the valve spool 44 to the now open bypass conduit 88. Of course, this results in high speed operation of the actuator assembly 26 to move the swashplate 28 quickly toward a position corresponding to the selected displacement of the pump unit 14.

When the displacement of the pump unit 14 has closely approached a displacement corresponding to the command signal, the error signal has a potential level which is less than the potential V3 and the amplifier 234 has an upgoing output signal. This results in the signal from the amplifier 230 being changed from a potential below the potential of the emitter of the PNP transistor 240 to a potential above the potential of the emitter of the transistor 240. The pilot valve solenoid coil 176 is then deenergized to enable a return spring 284 (see FIG. 2) to return the pilot valve 40 to the normal or unactuated condition in which it blocks fluid flow through the bypass conduit 88. As was previously explained, this reduces the rate at which fluid is ported through the main control valve 36 to thereby reduce the rate of operation of the actuator assembly 26.

When the swashplate 28 has been moved to a position corresponding to the displacement indicated by the command signal, the potential of the error signal transmitted to the amplifier 216 is reduced to a potential which is less than the potential V1 so that an upgoing signal is transmitted from the amplifier 216. This results in the relatively low potential V5 applied to the inverting terminal of the amplifier 220 being effective to cause the amplifier to have an upgoing output signal to the base of the PNP transistor 248. This deenergizes the pilot valve solenoid coil 174 and effects operation of the pilot valve 38 from the actuated condition back to the normal or closed condition of FIG. 2 under the influence of a biasing spring 288. Immediately thereafter, the main control valve spool 44 moves back to the neutral position of FIG. 2 to hydraulically lock the swashplate 28 in a position in which the pump unit 14 has a displacement corresponding to the position of the control lever 18.

When the forward operating displacement of the pump unit 14 is to be reduced, the control lever 18 is moved in a clockwise direction back toward the neutral position illustrated in dashed lines in FIG. 1. This results in downward movement of (as viewed in FIG. 3) the wiper 188 to reduce the potential of the command signal applied to the lead 184 with a resulting reduction in the potential applied to the inverting terminal of the amplifier 192. Assuming that the movement of the control lever 18 corresponds to a substantial change which is greater than the dead zone, the amplifier 256 quickly becomes saturated so that the resulting upgoing signal from the amplifier 192 results in the application of an upgoing signal to the inverting terminal of the amplifier 212. The resulting downgoing error signal is transmitted to the noninverting terminal of the amplifier 224. The downgoing output signal from the amplifier 224 is transmitted through the diode 228 to the noninverting terminal of the amplifier 230. This causes the amplifier 230 to have an output of a potential which is less than the potential of the emitter of the transistor 240 to render the transistor conducting and thereby effect energization of the pilot valve solenoid coil 176. Of course, this effects operation of the pilot valve 40 to effect operation of the main control valve 36 to the rightward actuated position.

Assuming that a large change is to be made in the displacement of the pump unit 14, the pilot valve 38 is actuated to increase the rate at which fluid is ported to the swashplate motor 62 (FIG. 1). Thus, the downgoing error signal is also transmitted to the noninverting terminal of the amplifier 242 which is connected with a summing junction 290 by the lead 244. In order to provide a time delay between actuation of the pilot valve 40 and the pilot valve 38, the time delay circuit 186 transmits a relatively high level signal to the summing junction 290 so that the output signal from the amplifier 220 is at a potential above the potential of the emitter of the PNP transistor 248 until a predetermined time period has elapsed. The high level signal from the time delay circuit 186 is then reduced and the output of the amplifier 220 is reduced to a potential below the potential of the transistor 248. Of course, this results in energization of the pilot valve solenoid coil 174 and actuation of the pilot valve 38.

To provide the time delay, the downgoing output signal from the amplifier 224 is transmitted over a lead 294 to a back poled diode 296 which is connected to the inverting terminal of the amplifier 274. This results in an upgoing signal being transmitted from the amplifier 274 to the summing junction 290. After a time period sufficient to enable the condenser 276 to become charged has elapsed, the output signal from the amplifier 274 is switched to a downgoing signal so that a relatively low potential is transmitted to the summing junction 290 from the amplifier 274. This changes the output of the amplifier 220 to a potential which is less than the potential of the emitter of the transistor 248 to thereby effect energization of the solenoid 174 and operation of the pilot valve 38 to increase the rate at which fluid is ported to the swashplate motor 62.

Once the displacement of the pump unit 14 has been reduced to a displacement closely approaching the selected displacement indicated by the command signal, the potential of the error signal will have increased to a level above the level of the voltage V4 applied to the inverting terminal of the amplifier 242. This results in the transmittal of an upgoing signal from the amplifier 242 to the summing junction 290. The output of the amplifier 220 then changes to a potential above the potential of the emitter of the transistor 248 to thereby effect deenergization of the pilot valve solenoid coil 174. When this occurs, the pilot valve 38 is returned back to the unactuated condition blocking fluid flow through the bypass conduit 114. Fluid is then ported at a relatively low rate between the main control valve 36 and the actuator assembly 26 to thereby effect low speed operation of the actuator assembly to enable the swashplate 28 to be accurately positioned at a displacement corresponding to the position of the control handle 18.

When the swashplate 28 has been moved to a position in which the pump unit 14 has a displacement corresponding to the displacement indicated by the command signal, the feedback and command signals correspond to the same displacement and the resulting error signal is ineffective to cause the amplifier 224 to have a downgoing output signal. The resulting relatively high potential output from the amplifier 224 is blocked by the diode 228 and the amplifier 230 changes to an output of a relatively high potential. This renders the transistor 240 nonconducting so that the pilot valve solenoid coil 176 is deenergized to thereby enable the return spring 284 to move the pilot valve 40 from the actuated condition back to the unactuated condition shown in FIG. 2. Since the pilot valve 38 is already returned to the nonactuated condition, the main control valve spool 44 is shifted to the neutral position illustrated in FIG. 2 blocking fluid flow to and from the actuator assembly 26.

When the output shaft 32 of the hydrostatic transmission 12 is to be driven in the reverse direction, the control circuitry 20 effects actuation of the control valve assembly 22 in much the same manner as previously explained in connection with forward operation of the hydrostatic transmission 12. However when the output speed of the hydrostatic transmission is to be increased in a reverse direction, the potential of the command signal applied to the lead 184 is reduced to a level below the potential applied to the lead 186. A resulting downgoing error signal is conducted over the lead 166 to the noninverting terminal of the amplifier 224. The output signal from the amplifier 230 is then reduced to a potential below the potential of the emitter of the transistor 240 to effect energization of the pilot valve solenoid coil 176.

The downgoing output from the amplifier 224 is transmitted to the time delay circuit 186 so that the amplifier 274 has a relatively high output potential during the time period required to charge the capacitor 276. Therefore if a relatively large change is to be made in the reverse operating speed of the hydrostatic transmission, the pilot valve solenoid 174 will be energized a predetermined time period after energization of the pilot valve solenoid coil 176 to thereby effect sequential operation of the pilot valves 38 and 40 in the manner previously explained.

When the displacement of the pump unit 14 is to be reduced during reverse operation of the hydrostatic transmission, the control handle 18 is moved toward the neutral position to thereby effect an increase in the potential of the command signal applied to the lead 184. This results in an upgoing error signal being transmitted from the amplifier 212 to the inverting terminal of the amplifier 216. The resulting energization of the pilot valve solenoid coil 174 effects operation of the pilot valve 38 to shift the main control valve 36 to the leftward actuated condition to thereby effect operation of the swashplate motor 56 to pivot the swashplate 28 in a counterclockwise direction and decrease the reverse effective operating displacement of the pump unit 14.

Of course, if a relatively large reduction is to be made in the reverse operating displacement of the hydrostatic transmission 14, the time delay circuit 186 prevents energization of the pilot valve solenoid coil 176 until a predetermined time period after energization of the pilot valve solenoid coil 174. When this time period has elapsed, the low potential signal transmitted to the inverting terminal of the amplifier 274 results in the transmission of the downgoing signal to the summing junction 264 and the amplifier 230 renders the transistor 240 conducting. This effects energization of the pilot valve solenoid coil 176 and highspeed operation of the actuator assembly 26 to quickly move the swashplate 28 in a counterclockwise direction toward the neutral position to thereby reduce the reverse operating displacement of the pump unit 14.

The operating conditions required to effect energization of the pilot valve solenoid coils 174 and 176 are represented by negative logic Boolean algebra equations in FIG. 3 of the drawings. Thus, in order for the amplifier 22 to have a relative-low potential output signal D to render the PNP transistor 248 conducting, it is necessary for the A signal transmitted from the amplifier 216 to the noninverting terminal of the amplifier 220 to have a relatively low potential or to have relatively low potential B' and C signals conducted to the summing junction 290 from the amplifier 274 and from the amplifier 242. Similarly, in order for amplifier 230 to have a relatively low potential output signal E to render the transistor 240 conducting to thereby effect energization of the pilot valve solenoid coil 176, it is necessary to have a relatively low potential B signal conducted from the amplifier 224 to the noninverting terminal of the amplifier 230 or to have a relatively low potential signal C conducted to the summing junction 264 from the amplifier 274 and a relatively low potential signal A' conducted to the summing junction 264 from the amplifier 234.

SECOND EMBODIMENT OF THE INVENTION

In the embodiment of the invention illustrated in FIGS. 1–3, the hydrostatic transmission 12 has a variable displacement pump 14 and a fixed displacement motor 30. In the embodiment of the invention illustrated in FIG. 4, both the pump and the motor are of the variable displacement type. Since the embodiment of the invention illustrated in FIG. 4 has many components which are the same as the components of the embodiment of the invention illustrated in FIGS. 1–3, similar numerals will be utilized to designate similar components, the suffix letter a being associated with the components of the invention of FIG. 4 to avoid confusion.

In the embodiment of the invention illustrated in FIG. 4, movement of a control handle 18a effects activation of control circuitry 20a to operate control valve assembly 22a to vary the displacement of the pump unit 14a in the same manner previously described in connection with the embodiment of the invention illustrated in FIGS. 1–3. If a relatively large change is to be made in the displacement of the pump unit 14a, the control circuitry 20a effects operation of the control valve assembly 22a to port fluid at a relatively high rate to an actuator assembly 26a to move the swashplate 28a to a position closely approximating the selected displacement. When the swashplate 28a has been moved to this position, the control circuitry 20a effects operation of the control valve assembly 22a to reduce the rate at which fluid is ported to the actuator assembly 26a to thereby enable the swashplate 28a to be moved slowly and accurately to a position corresponding to the selected displacement.

Figure 4:
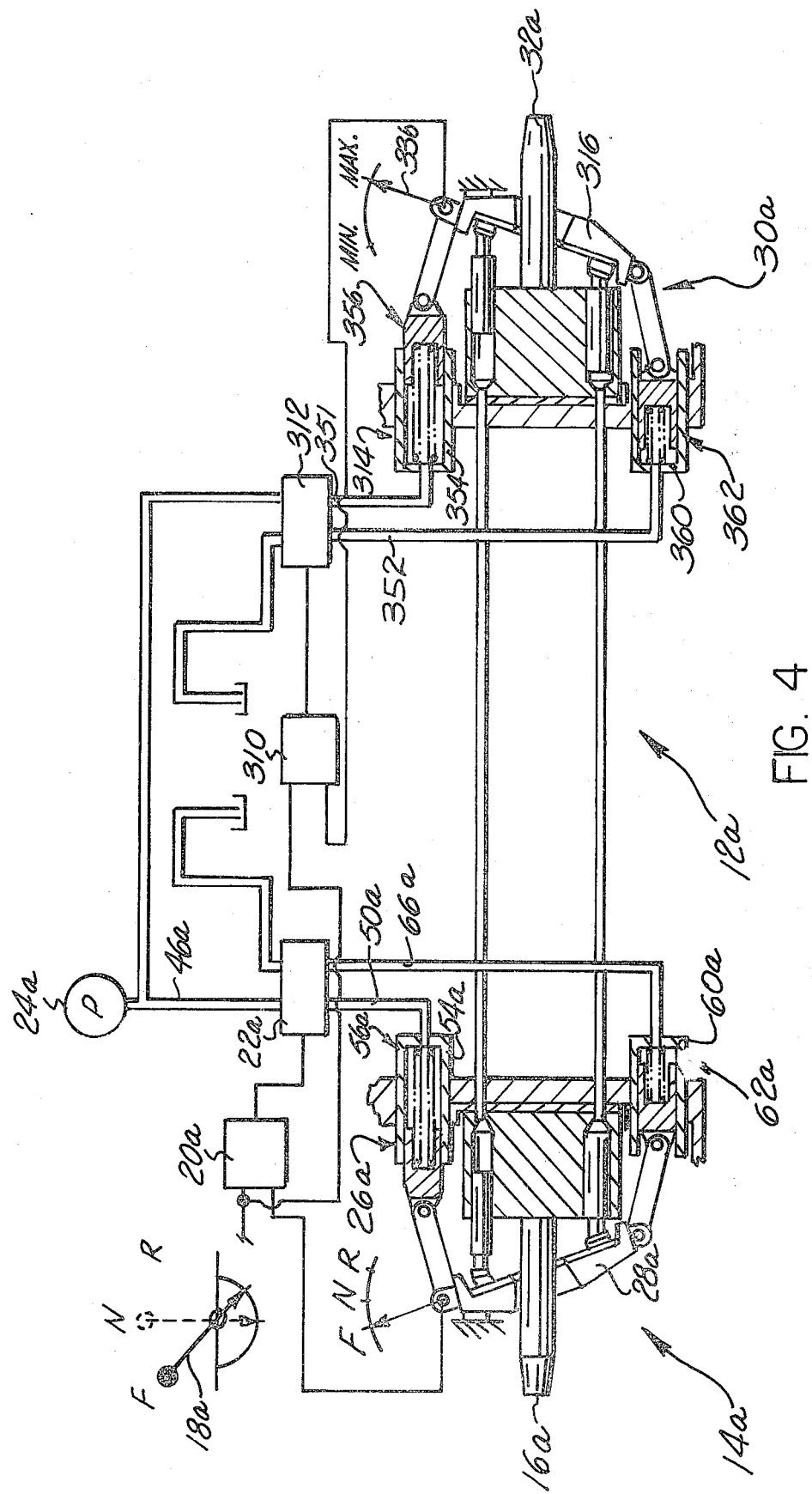
FIG. 4 is a schematic illustration of a second embodiment of the invention in which a control system is utilized to vary the displacement of pump and motor units of a hydrostatic transmission.

In accordance with a feature of the embodiment of the invention illustrated in FIG. 4, the control handle 18a may be actuated to vary the output speed of the hydrostatic transmission 12a by such a large amount that merely changing the displacement of the pump unit 14a is ineffective to provide the desired change in the output speed. When this occurs, control circuitry 310 is activated to effect operation of a main control valve assembly 312 to connect the charge pump 24a in fluid communication with an actuator assembly 314 for effecting movement of a swashplate 316 of the motor 30a between a maximum displacement condition (illustrated in FIG. 4) and a minimum displacement condition. If the displacement of the motor unit 30a is to be varied by a relatively large amount, the electrical control circuitry 310 effects operation of the control valve assembly 312 to increase the rate at which fluid is ported to the actuator assembly 314 to thereby increase the speed with which the swashplate moved toward the desired displacement condition. when the swashplate 316 has closely approached the desired displacement, the electrical control circuitry 310 effects operation of the control valve assembly 312 to reduce the rate at which fluid is ported to the actuator assembly 314 to thereby enable the motor swashplate 316 to be more slowly and accurately moved to a desired displacement position.

The control valve assembly 312 has the same construction as the control valve assembly 22 of FIGS. 1 and 2. It should be noted that the control valve assembly 312 includes a main control valve of the same construction as the main control valve 36 of FIG. 2. The main control valve in the control valve assembly 312 includes a main valve spool, corresponding to the main control valve spool 44, which is moved from a neutral position to a leftward actuated position during operation of a first pilot valve, corresponding to the pilot valve 38, and is moved from the neutral position to a rightward actuated position upon operation of a second pilot valve, corresponding to the pilot valve 40 of FIG. 2.

When a relatively large change is to be made in the displacement of the motor unit 30a, both the pilot valves in the valve assembly 312 are actuated to effect a porting of fluid at a relatively high rate to the actuator assembly 314. Thus, when the pilot valve corresponding to the pilot valve 38 of FIG. 2 has been actuated to effect a shifting of the main valve spool to the leftward actuated position, the second pilot valve is subsequently actuated to effect a relatively high speed operation of the actuator assembly 314 (see FIG. 4). Similarly, when the pilot valve corresponding to the pilot valve 40 has been actuated to effect movement of the main valve spool to a rightward actuated position, the first pilot valve, that is the pilot valve corresponding to the pilot valve 38 of FIG. 2, is actuated to increase the rate of flow of fluid between the main control valve and the actuator assembly 314 to thereby effect rapid movement of the swashplate 316.

The interaction between the main control valve and the two pilot valves of the control valve assembly 312 in the actuator assembly 314 is the same as the interaction between the main control valve 36 and the pilot valves 38 and 40 with the actuator assembly 26 in the embodiment of the invention illustrated in FIGS. 1–3. Therefore, the construction and interaction of these components will not be further described herein. Although the pump and motor actuator assemblies 26a and 314 could be constructed in many different manners, the actuator assemblies are constructed in a manner which is generally similar to that disclosed in U.S. Pat. No. 3,795,109.

MOTOR DISPLACEMENT CONTROL CIRCUITRY

The motor displacement control circuitry 310 is generally similar to the electrical control circuitry 20 of the embodiment of FIGS. 1–3. Thus, the motor displacement control circuitry 310 includes a main or input circuit 320 (FIG. 5) which receives a command signal from the same input as the electrical control circuitry 20a of FIG. 4. The command signals which are applied to leads 326 and 328 of the command or input circuitry 320 are the same as the command signal applied to the input leads of the pump control circuitry 22a and are also indicative of a selected or desired displacement for the motor unit 30a of FIG. 4. It should be noted that during relatively low speed operation of the hydrostatic transmission the selected displacement of the motor unit 30a will remain substantially constant at the maximum displacement condition and the output speed of the hydrostatic transmission will be varied by varying the displacement of the pump unit 14a in the manner previously explained.

A position feedback circuit 332 is connected with the command circuit 320 and includes a potentiometer 334 having a pointer 336 connected with the swashplate 316 of the motor unit 30a (see FIG. 4). The pointer 336 cooperates with a resistance 338 to provide a feedback signal which varies as a function of the displacement of the motor unit 30a. A sequence adjust potentiometer 342 is connected with the position feedback potentiometer 334. The sequence adjust potentiometer 342 is adjusted to effect sequencing or staging of the pump and motor units 14a and 30a. By properly adjusting the potentiometer 342, the motor displacement control circuitry 310 will initiate operation of the control valve assembly 312 to decrease the displacement of the motor unit 30a when pump unit 14a has been actuated to a predetermined displacement in either the forward or the reverse direction.

In addition to the command or input circuitry 320 and the position feedback circuitry 332, the motor displacement control circuitry 310 includes a valve actuation circuit 346 for effecting energization of pilot valve solenoid coils 348 and 350 when there is a difference between the desired or selected motor displacement indicated by the command signal and the actual motor displacement indicated by the signal from the feedback control circuitry 332. The pilot valve solenoid coil 348 is connected with the pilot valve in the control valve assembly 312 which corresponds to the pilot valve 38 of the control valve assembly 22. Similarly, the pilot valve solenoid coil 350 is connected with a pilot valve in the control vlave assembly 312 which corresponds to the pilot valve 40 in the control valve assembly 22 of FIG. 2.

Upon energization of the pilot valve solenoid coil 348, a pilot valve is energized to effect operation of a main control valve in the control valve assembly 312 to port high pressure fluid through a conduit 351 to a cylinder 354 (see FIG. 4) of an upper swashplate motor 356. Similarly, energization of the pilot valve solenoid coil 350 effects operation of a main control valve in the control valve assembly 312 to port high pressure fluid through a conduit 352 to a cylinder 360 of a swashplate motor 362.

A main control circuit 370 effects energization of the pilot valve solenoid coil 350 to actuate the main control valve in the control valve assembly 312 to reduce the displacement of the motor unit 30a when the displacement indicated by the command signal is less than the actual displacement indicated by the feedback signal from the feedback signal circuit 164. Similarly, if the motor swasplate 316 is in a position other than the maximum displacement condition and the command signal indicates a motor unit displacement which is greater than the actual displacement of the motor unit as indicated by the feedback signal from the circuit 332, the main control circuitry 370 effects energization of the pilot valve solenoid coil 348 to effect operation of a main control valve to an actuated condition porting fluid to the swashplate motor 356 to thereby move the motor swashplate 316 to the maximum displacement condition.

Rate control circuitry 374 (see FIG. 5) is connected with the main control circuitry 370 to effect energization of the pilot valve solenoid coil 350 when the displacement of the motor unit 30a is to be reduced by a relatively large amount. Energization of the pilot valve solenoid 350 effects operation of a pilot valve corresponding to the pilot valve 40 of FIG. 2, to increase the rate at which fluid is ported between the control valve assembly 312 and the actuator assembly 314. Thus, energizing the pilot valve solenoid coil 348 effects operation of a pilot valve to open a bypass passage so that fluid can be exhausted from the cylinder 354 at a relatively high rate.

Similarly, when the displacement of the motor unit 30a is to be increased by a relatively large amount, the pilot valve solenoid 350 is energized to increase the rate at which fluid is conducted between the control valve assembly 312 and the actuator assembly 314. energization of the pilot valve solenoid coil 350 effects operation of a pilot valve in the control valve assembly 312, that is the pilot valve corresponding to the pilot valve 38 of FIG. 2, to open a bypass passage and thereby enable fluid to be exhausted at a relatively high rate from the cylinder 360.

A time delay circuit 378 cooperates with the main control circuit 370 and the rate control circuit 374 to effect sequential operation of the pilot valves in the control valve assembly 312 in the manner previously expalined in connection with the embodiment of the invention illustrated in FIGS. 1–3. Thus, when the displacement of the motor unit 30a is to be quickly decreased, the pilot valve solenoid coil 348 is energized at predetermined time period after energization of the pilot valve solenoid coil 350. Similarly, when the displacement of the motor unit 30a is to be quickly increased, the pilot valve solenoid 350 is energized a predetermined time period after energization of the pilot valve solenoid coil 348.

Since the manner in which the valve actuation circuitry 346 cooperates with the pilot valve solenoid coils 348 and 350 is the same as previously described in connection with the embodiment of the invention illustrated in FIGS. 1–3, it will not be further described herein to avoid prolixity of description. However, it should be noted that the Boolean algebra equations illustrated in FIG. 5 of the drawings are of the negative logic type, that is a low potential signal D to effect energization of the pilot valve solenoid coil 348 is provided whenever there is a low potential signal A or a low potential signal C and a low potential signal B'. Similarly, there is a low potential signal E to effect energization of the pilot valve solenoid coil 350 whenever there is a low potential signal B or a low potential signal C and a low potential signal A'.

The command or input circuitry 320 differs from the command or input circuitry 160 in the embodiment of the invention illustrated in FIG. 3 in that a relatively high potential error signal is provided on a lead 384 whenever the displacement control lever 18a is in the neutral position. This high potential error signal is transmitted to the valve actuation circuitry 346 to maintain the pilot valve solenoid coil 348 in an energized condition so that the main control valve in the control valve assembly 312 is maintained in a leftward actuated condition porting high pressure fluid through the conduit 351 (see FIG. 4) to the cylinder 354 of the swashplate motor 356. This high pressure fluid acts as a biasing force to maintain the swashplate 316 in the maximum displacement position illustrated in FIG. 4.

When the control lever 18a is in the neutral position illustrated in dashed lines in FIG. 4, the same potential is applied to the two input leads 326 and 328. The noninverting terminal of the amplifier 390 is connected with ground. Therefore, the amplifier 390 is biased to a saturation point and has a low potential output which is transmitted to a summing junction 392. The noninverting terminal of an amplifier 396 is also connected with ground so that when the control lever 18a is in the neutral condition and equal voltages are applied to the two input leads 326 and 328, the amplifier 396 is biased to a saturation point and has a low potential output signal. This low potential output signal is also transmitted to the summing junction 392.

Figure 5:
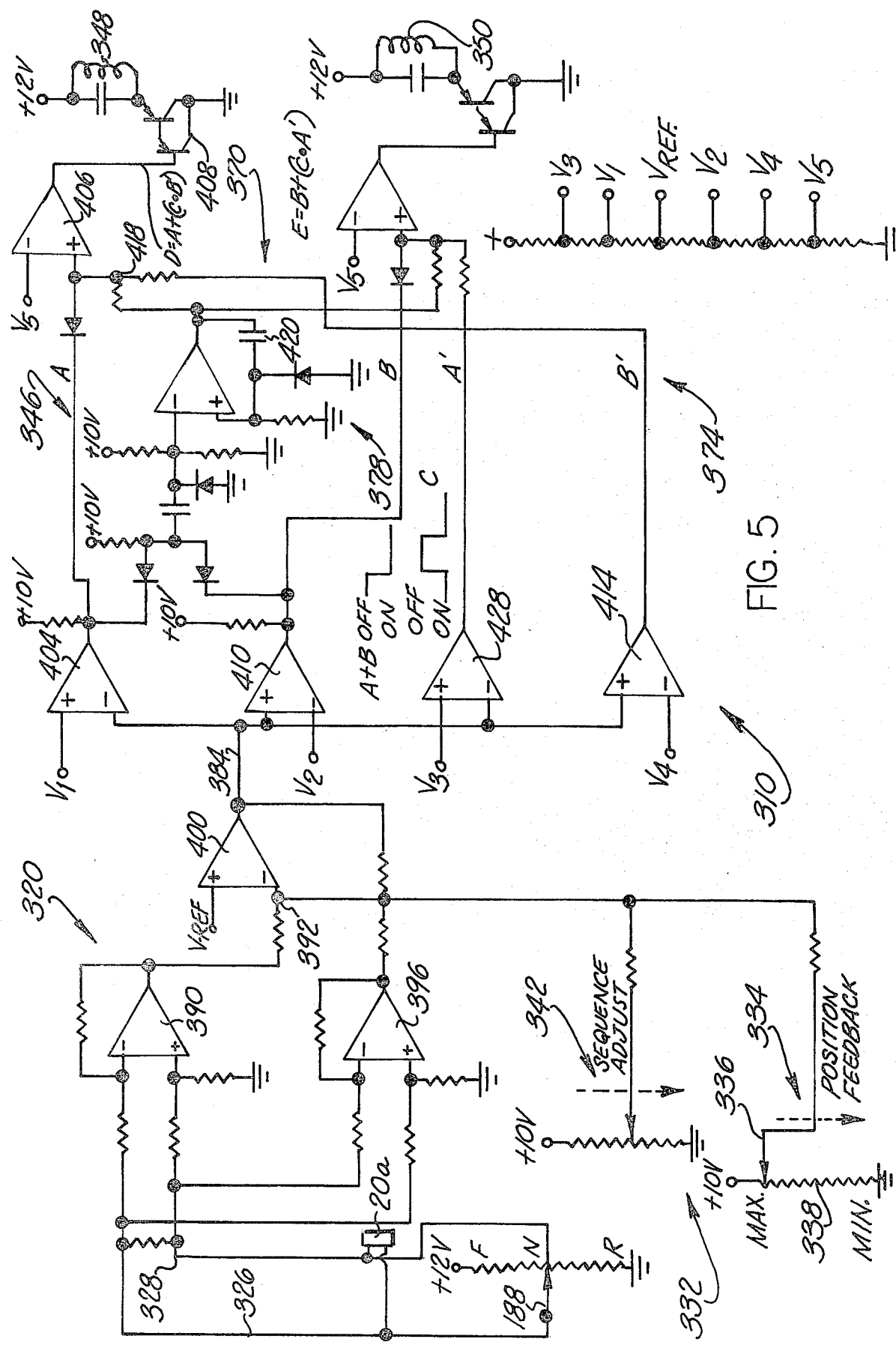
FIG. 5 is a schematic illustration of electrical control circuitry utilized in the motor unit control system of FIG. 4.

When the motor swashplate 316 is in the maximum displacement condition shown in FIG. 4, the feedback position potentiometer 334 is in the condition shown in FIG. 5 and has a relatively high potential output signal which is transmitted to the summing junction 392. However due to the low potential signals from the saturated amplifiers 390 and 396, the resulting potential which is applied from the summing junction 392 to the inverting terminal of an amplifier 400 is at a level which is lower than the reference potential applied to the noninverting terminal of the amplifier 400. Therefore the amplifier 400 has a relatively high potential output signal when the control lever 18a is in the neutral position. Of course, this high potential output signal is transmitted to the inverting terminal of an amplifier 404 and is effective to cause the output of the amplifier 404 to have a relatively low potential. This low potential is transmitted to the noninverting terminal of an amplifier 406 to render a transistor 408 conducting to thereby effect energization of the pilot valve solenoid coil 348. When the pilot valve solenoid coil 348 is energized, the motor control valve assembly 312 is effective to port fluid from the pump 24a to the conduit 351 to maintain the swashplate 316 in the maximum displacement position.

When the forward output speed of the hydrostatic transmission 12a is to be increased by a relatively large amount, the control handle 18a is moved so that a the potential applied to the lead 326 is increased by a relatively large amount. The resulting upgoing signal is transmitted to the inverting terminal of the amplifier 390 and is effective to further saturate the amplifier. However, the upgoing signal is also applied to the noninverting terminal of the amplifier 396 and is effective to cause it to come out of saturation so that an upgoing signal is transmitted from the amplifier 396 to the summing junction 392. This results in the transmittal of the downgoing error signal to the inverting terminal of the amplifier 404 to thereby effect deenergization of the pilot valve solenoid coil 348. This operates a pilot valve to effect movement of the main valve spool toward the neutral position.

The downgoing error signal is also transmitted to the noninverting terminal of the amplifier 410 to effect energization of the pilot valve solenoid coil 350. This results in a shifting of the main valve spool in the valve assembly 312 to port fluid under pressure to the conduit 352 leading to the swashplate motor 362. If the downgoing error signal is of a sufficiently low potential, an amplifier 414 in the rate control circuit 374 is effective to transmit a low potential signal to a summing junction 418. After a suitable time delay sufficient to enable the condenser 420 in the time delay circuit 378 to become charged, the downgoing output signal from the amplifier 422 is also transmitted to the summing junction 418 to effect energization of the pilot valve solenoid 348 to thereby increase the rate at which fluid is ported from the control valve assembly 312 to the swashplate motor 362.

When the swashplate 316 has closely approached a position corresponding to the selected operating position, the relatively low potential error signal is ineffective to overcome the influence of the biasing voltage V4 applied to the inverting terminal of the amplifier 414. The pilot valve solenoid coil 348 is then deenergized and fluid is ported at a relatively low rate from the main valve assembly 312 to the swashplate motor 362. When the feedback signal from the circuitry 332 corresponds to the command signal, the output from the amplifier 400 will have increased to a potential such that the potential V2 applied to the inverting terminal of the amplifier 410 is effective to cause the pilot valve solenoid 350 to be deenergized. When this occurs, the second pilot valve in the valve assembly 312 is closed and the main valve spool shifted to its neutral position hydraulically locking the swashplate motor 316 against further movement.

When the operating speed of the motor 30a is to be reduced, the potential applied to the lead 326 is reduced. The resulting downgoing command signal reduces the potential of the output signal from the amplifier 396 to thereby effect an increase in the potential of the error signal transmitted from the amplifier 400. This upgoing error signal is transmitted to the inverting terminal of the amplifier 404 to effect energization of the pilot valve solenoid 348 to thereby move the main valve spool in the valve assembly 312 to port fluid to the swashplate motor 356 to increase the displacement of the motor unit 30a. Assuming that a relatively large change is to be made in the displacement of the motor unit 30a, the relatively high potential error signal voltage applied to the inverting terminal of an amplifier 428 is sufficient to effect energization of the pilot valve solenoid coil 350 after the condenser 420 is charged and a predetermined time period has elapsed since energization of the pilot valve solenoid coil 348. Of course, energization of the pilot valve solenoid coil 350 effects operation of a pilot valve to increase the rate at which fluid is ported between the valve assembly 312 and the actuator assembly 314.

When the motor unit 30a is in the maximum displacement condition of FIG. 4 and the pump unit 14a is being operated in a reverse direction, the control handle 18a may be moved through a relatively large distance to effect a large decrease in the negative magnitude of the negative voltage applied to the lead 326. This downgoing signal is transmitted to the noninverting terminal of the amplifier 396 and drives it further into saturation. However, the downgoing signal is also transmitted to the inverting terminal of the amplifier 390 so that it comes out of saturation and applies an upgoing signal to the summing junction 392 and inverting terminal of the amplifier 400. The resulting downgoing error signal effects deenergization of the pilot valve solenoid coil 348 and energization of the pilot valve solenoid coil 350 to shift the main valve spool in the control valve circuitry 312 to port high pressure fluid to the swashplate motor 362 in the manner previously explained. Assuming that a relatively large increase is to be made in the reverse operating speed, the pilot valve solenoid coil 348 is again energized after a predetermined period has elapsed to effect high speed operation of the actuator assembly 314 in the manner previously explained.

When the swashplate 316 of the motor unit 30a is moved to a position closely approximating the selected position, the potential of the error signal has increased sufficiently to result in deenergization of a pilot valve solenoid coil 348. When the swashplate 316 has been accurately positioned in a position corresponding to the selected displacement, the pilot valve solenoid coil 350 is deenergized to thereby effect operation of the control valve assembly 312 to lock the motor swashplate 316 in position.

When the reverse operating speed of the hydrostatic transmission 12a is to be reduced when the motor swashplate 316 is in a position other than the maximum displacement position, the resulting increase in the value of the voltage applied to the lead 326 is transmitted to the amplifier 390 to effect a change in the error signal and energization of the pilot valve solenoid coil 348 to shift the main valve spool in the control valve assembly 312 to port fluid under pressure to the swashplate motor 356. If a relatively large reduction is to be effected in the reverse operating speed of the hydrostatic transmission, the solenoid valve coil 350 is also energized after a predetermined time period to increase the rate at which fluid is ported to the swashplate

SUMMARY

In veiw of the foregoing description, it can be seen that the present invention provides a control system for varying the displacement of one or more units of a hydrostatic transmission. The control system can be utilized to vary the displacement of the pump unit 14 of a hydrostatic transmission as in the embodiment of FIGS. 1-3, to vary the displacement of both the pump and motor units as in the embodiment of FIGS. 4 and 5, or to vary the displacement of only the motor unit of the hydrostatic transmission. The control system includes a main control valve 36 which is operated from a neutral position to either one of two actuated positions, that is either a rightward or leftward actuated position as viewed in FIG. 2, to either increase or decrease the displacement of the associated unit of the hydrostatic transmission. Two pilot valves 38 and 40 are selectively operated to effect actuation of the main control valve 36 to a selected one of its actuated positions. In addition, the two pilot valves 38 and 40 are selectively operable to vary the rate at which fluid is ported to the main control valve 36.

When the main control valve 36 is to be actuated to increase the displacement of a hydrostatic transmission, the first pilot valve 38 is actuated. Actuation of the pilot valve 38 effects a shifting of the main valve spool 44 from the neutral position shown in FIG. 2 to a leftward actuated position in which the main valve spool 44 ports fluid to effect operation of an actuator assembly 26 to increase the displacement of the hydrostatic transmission. If a relatively large change is to be made in the displacement of a hydrostatic transmission, the second pilot valve 40 is actuated to effect an increase in the rate at which fluid is ported between the main control valve 36 and the actuator assembly.

When the displacement of the hydrostatic transmission is to be decreased, the second pilot valve 40 is actuated to effect movement of the main valve spool 44 from the neutral position of FIG. 2 to a rightward actuated position in which the main control valve 36 ports fluid to effect operation of the actuator assembly to decrease the effective displacement of the hydrostatic transmission. If a relatively large reduction is to be made in the displacement of the hydrostatic transmission, the pilot valve 38 is also actuated to increase the rate at which fluid is ported between the main control valve 36 and the actuator assembly to thereby increase the rate of operation of the actuator assembly to quickly effect the desired reduction in the displacement of the hydrostatic transmission. Thus, each of the two pilot valves 38 and 40 can be utilized to either effect operation of the main control valve 36 or to effect a change in the rate at which fluid is ported by the main control valve. The purpose of the resistance and voltage values in the drawings are merely to provide a better understanding of the operation of the given electrical control circuits. They are not intended as limitations on the disclosure or the operation of the apparatus.

Having described specific preferred embodiments of the invention, the following is claimed:

1. An apparatus comprising a hydrostatic transmission including a pump unit connected in fluid communication with a motor unit, actuator means for varying the displacement of one of said units, main control valve means for porting fluid to effect operation of said actuator means to vary the displacement of said one unit of said hydrostatic transmission, said main control valve means being operable from a neutral condition to a first condition to effect operation of said actuator means to increase the displacement of said one unit of said hydrostatic transmission and being operable from the neutral condition to a second condition to effect operation of said actuator means to decrease the displacement of said one unit of said hydrostatic transmission, first pilot valve means for effecting operation of said main control valve means from the neutral condition to the first condition and for effecting a variation in the rate at which fluid is ported by said main control valve means independently of said main control valve means when said main control valve means is in the second condition to thereby effect a variation in the rate at which said actuator means decreases the displacement of said one unit of said hydrostatic transmission, and second pilot valve means for effecting operation of said main control valve means from the neutral condition to the second condition and for effecting a variation in the rate at which fluid is ported by said main control valve means independently of said main control valve means when said main control valve means is in the first condition to thereby effect a variation in the rate at which said actuator means increases the displacement of said one unit of said hydrostatic transmission.

2. An apparatus as set forth in claim 1 further including first passage means for conducting fluid between said actuator means and said first pilot valve means when said main control valve means is in the second condition, said first pilot valve means being operable from a first condition in which a relatively low fluid flow is directed through said first passage means to a second condition in which a relatively high fluid flow is directed through said first passage means to thereby effect a variation in the rate at which fluid is ported by said main control valve means when said main control valve means is in its second condition, second passage means for conducting fluid between said actuator means and said second pilot valve means when said main control valve means is in the first condition, said second pilot valve means being operable from a first condition in which a relatively low fluid flow is directed through said second passage means to a second condition in which a relatively high fluid flow is directed through said second passage means to thereby effect a variation in the rate at which fluid is ported by said main control valve means when said main control valve means is in its first condition.

3. An apparatus as set forth in claim 2 further including means for preventing operation of said first pilot valve means from its first condition to its second condition for a predetermined time period after initiation of operation of said second pilot valve means from its first condition to its second condition and for preventing operation of said second pilot valve means from its first condition to its second condition for a predetermined time period after initiation of operation of said first pilot valve means from its first condition to its second condition.

4. An apparatus as set forth in claim 1 further including first means for providing a first electrical signal indicative of the displacement of said one unit, second means for providing a second electrical signal indicative of a selected displacement of said one unit, means for providing an electrical output signal which indicates whether the displacement of said one unit is greater than or less than the selected displacement, means for effecting actuation of said first pilot valve means to effect operation of said main control valve means from the neutral condition to the first condition when said output signal indicates that the displacement of said one unit is less than the selected displacement, and means for effecting actuation of said second pilot valve means to effect operation of said main control valve means from the neutral condition to the second condition when said output signal indicates that the displacement of said one unit is greater than the selected displacement.

5. An apparatus as set forth in claim 1 further including first means for providing a first electrical signal indicative of the displacement of said one unit, second means for providing a second electrical signal indicative of a selected displacement of said one unit, means for providing a first electrical output signal which indicates whether the displacement of said one unit is less than the selected displacement by an amount which is greater than or less than a first predetermined amount when the displacement of said one unit is less than the selected displacement and for providing a second electrical output signal which indicates whether the displacement of said one unit exceeds the selected displacement by an amount which is greater than or less than a second predetermined amount when the displacement of said one unit exceeds the selected displacement, means for effecting actuation of said first pilot valve means to effect operation of said main control valve means from the neutral condition to the first condition when said first output signal indicates that the displacement of said one unit is less than the selected displacement and for effecting operation of said second pilot valve means to provide a relatively high rate at which fluid is ported by said main control valve means when said first output signal indicates that the displacement of said one unit is less than the selected displacement by an amount which is greater than the first predetermined amount, and means for effecting actuation of said second pilot valve means to effect operation of said main control valve means from the neutral condition to the second condition when said second output signal indicates that the displacement of said one unit exceeds the selected displacement and for effecting operation of said first pilot valve means to provide a relatively high rate at which fluid is ported by said main control valve means when said second output signal indicates that the displacement of said one unit exceeds the selected displacement by an amount which is greater than said second predetermined amount.

6. An apparatus as set forth in claim 5 further including means for preventing actuation of said second pilot valve means for a predetermined time period after initiation of actuation of said first pilot valve means and for preventing actuation of said first pilot valve means for a predetermined time period after initiation of actuation of said second pilot valve means.

7. An apparatus comprising a hydrostatic transmission including a pump unit connected in fluid communication with a motor unit, actuator means for varying the displacement of one of said units, main control valve means connected in fluid communication with said actuator means for porting fluid to effect operation of said actuator means to vary the displacement of said one unit of said hydrostatic transmission, said main control valve means including a main valve member movable from a neutral position to a first actuated position to port fluid to effect operation of said actuator means to increase the displacement of said one unit and movable from the neutral position to a second actuated position to port fluid to effect operation of said actuator means to decrease the displacement of said one unit, first pilot valve means operable from a first condition to a second condition to effect movement of said main valve member from the neutral position to the first actuated position and to maintain said main valve member in the first activated position until said first pilot valve means is operated from the second condition to the first condition, and second pilot valve means operable from a first condition to a second condition to effect movement of said main valve member from the neutral position to the second actuated position and to maintain said main valve member in the second actuated position until said second pilot valve means is operated from the second condition to the first condition, said first pilot valve means being operable from its first condition to its second condition while said second pilot valve means is in its second condition to effect a variation in the rate at which fluid is ported by said main control valve means to thereby effect a variation in the rate of operation of said actuator means and the rate at which the displacement of said one unit is varied, said second pilot valve means being operable from its first condition to its second condition when said first pilot valve means is in its second condition to effect a variation in the rate at which fluid is ported by said main control valve means to thereby effect a variation in the rate of operation of said actuator means and the rate at which the displacement of said one unit is varied.

8. An apparatus as set forth in claim 7 further including first passage means for conducting fluid between said actuator means and said first pilot valve means when said main valve member is in the second actuated position, said first pilot valve means being effective in its first condition to retard fluid flow through said first passage means and being effective in its second condition to promote fluid flow through said first passage means to thereby effect a variation in the rate at which fluid is ported by said main control valve means when said main valve member is in the second actuated position, second passage means for conducting fluid between said actuator means and said second pilot valve means when said main valve member is in the first actuated position, said second pilot valve means being effective in its first condition to retard fluid flow through said second passage means and being effective in its second condition to promote fluid flow through said second passage means to thereby effect a variation in the rate at which fluid is ported by said main control valve means when said main valve member is in the first actuated position.

9. An apparatus as set forth in claim 7 further including means for preventing operation of said first pilot valve means for preventing operation of said first pilot valve means from its first condition to its second condition for a predetermined time period after initiation of operation of said second pilot valve means from its first condition to its second condition and for preventing operation of said second pilot valve means from its first condition to its second condition for a predetermined time period after initiation of operation of said first pilot valve means from its first condition to its second condition.

10. An apparatus as set forth in claim 7 further including first means for providing a first electrical signal indicative of the displacement of said one unit, second means for providing a second electrical signal indicative of a selected displacement of said one unit, means for providing a first electrical output signal which indicates whether the displacement of said one unit is less than the selected displacement by an amount which is greater than or less than a first predetermined amount when the displacement of said one unit is less than the selected displacement and for providing a second electrical output signal which indicates whether the displacement of said one unit exceeds the selected displacement by an amount which is greater than or less than a second predetermined amount when the displacement of said one unit exceeds the selected displacement, means for effecting actuation of said first pilot valve means from its first condition to its second condition to effect movement of said main valve member from the neutral position to the first actuated position when said first output signal indicates that the displacement of said one unit is less than the selected displacement and for effecting actuation of said second pilot valve means from its first condition to its second condition to effect an increase in the rate at which fluid is ported by said main control valve means when said first output signal indicates that the displacement of said one unit is less than the selected displacement by an amount which is greater than the first predetermined amount, and means for effecting actuation of said second pilot valve means from its first condition to its second condition to effect movement of said main valve member from the neutral position to the second actuated position when said second output signal indicates that the displacement of said one unit exceeds the selected displacement and for effecting actuation of said first pilot valve means from its first condition to its second condition to effect an increase in the rate at which fluid is ported by said main control valve means when said second output signal indicates that the displacement of said one unit is greater than the selected displacement by an amount which is greater than said second predetermined amount.

11. An apparatus as set forth in claim 7 wherein said main valve member has opposite ends, said main control valve means includes first pressure chamber means for holding fluid under pressure and in fluid communication with one end of said main valve member and second pressure chamber means for holding fluid under pressure and in fluid communication with the other end of said main valve member, said apparatus further including first passage means for connecting said first pressure chamber means in fluid communication with said first pilot valve means, and second passage means for connecting said second pressure chamber means in fluid communication with said second pilot valve means, said first pilot valve means being effective to vary the fluid pressure in said first pressure chamber means upon operation of said first pilot valve means from its first condition to its second condition to thereby effect movement of said main valve member from said neutral position to said first position, said second pilot valve means being effective to vary the fluid pressure in said second pressure chamber means upon operation of said second pilot valve means from its first condition to thereby effect movement of said main valve member from said neutral position to said second position.

12. An apparatus comprising a hydrostatic transmission including a pump unit connected in fluid communication with a motor unit, actuator means for varying the displacement of one of said units, main control valve means for porting a fluid to effect operation of said actuator means to vary the displacement of said one unit of said hydrostatic transmission, said main control valve means being operable from a neutral condition to a first condition to effect operation of said actuator means to increase the displacement of said one unit of said hydrostatic transmission and being operable from the neutral condition to a second condition to effect operation of said actuator means to decrease the displacement of said one unit of said hydrostatic transmission, first pilot valve means for effecting operation of said main control valve means from the neutral condition to the first condition and for effecting a variation in the rate at which fluid is ported by said main control valve means when said main control valve means is in the second condition to thereby effect a variation in the rate at which said actuator means decreases the displacement of said one unit of said hydrostatic transmission, second pilot valve means for effecting operation of said main control valve means from the neutral condition to the second condition and and for effecting a variation in the rate at which fluid is ported by said main control valve means when said main control valve means is in the first condition to thereby effect a variation in the rate at which said actuator means increases the displacement of said one unit of said hydrostatic transmission, first means for providing a first signal indicative of the displacement of said one unit of the hydrostatic transmission, second means for providing a second signal indicative of a selected displacement of said one unit of said hydrostatic transmission, means for providing an output signal which indicates whether the displacement of said one unit of said hydrostatic transmission is less than the selected displacement by an amount which is greater or less than a first predetermined amount when the displacement of said one unit of said hydrostatic transmission is less than the selected displacement and for providing a second output signal which indicates whether the displacement of said one unit exceeds the selected displacement by an amount which is greater or less than a second predetermined amount when the displacement of said one unit exceeds the selected displacement, means for effecting actuation of said first pilot valve means to effect operation of said main control valve means from the neutral condition to the first condition when said first output signal indicates that the displacement of said one unit is less than the selected displacement and for effecting actuation of said second pilot valve means to effect an increase in the rate at which fluid is ported by said main control valve means when said main control valve means is in the second condition and said first output signal indicates that the displacement of said one unit is less than the selected displacement by an amount which is greater than the first predetermined amount, and means for effecting activation of said second pilot valve means to effect operation of said main control valve means from the neutral condition to the second condition when said second output signal indicates that the displacement of said one unit exceeds the selected displacement and for effecting actuation of said first pilot valve means to effect an increase in the rate at which fluid is ported by said main control valve means when said main control valve means is in the second condition and said second output signal indicates that the displacement of said one unit of said hydrostatic transmission is greater than the selected displacement by an amount which is greater than said second predetermined amount.

13. An apparatus as set forth in claim 12 further including means for preventing actuation of said second pilot valve means for a predetermined time period after initiation of actuation of said first pilot valve means and for preventing actuation of said first pilot valve means for a predetermined time period after initiation of actuation of said second pilot valve means.

14. An apparatus as set forth in claim 12 further including detector means for detecting when the displacement of said one unit is closely approaching the selected displacement with said first and second pilot valve means actuated and said main control valve means porting fluid at a relatively high rate, and means for effecting operation of one of said first and second pilot valve means to reduce the rate at which fluid is ported by said main control valve means in response to detection by said detector means that the displacement of said one unit is closely approaching the selected displacement.

15. An apparatus comprising a hydrostatic transmission including a pump unit connected in fluid communication with a motor unit, first actuator means for varying the displacement of said pump unit, first control valve means for porting fluid to effect operation of said first actuator means to vary the displacement of said pump unit of said hydrostatic transmission, said first control valve means being operable from a neutral condition to a first condition to effect operation of said first actuator means to increase the displacement of said pump unit of said hydrostatic transmission and being operable from the neutral condition to a second condition to effect operation of said first actuator means to decrease the displacement of said pump unit of said hydrostatic transmission, a first pilot valve member movable between first and second positions, means for moving said first pilot valve member from said first position to said second position to effect operation of said first control valve means from the neutral condition to the first condition and for moving said first pilot valve member from said first position to said second position to effect a variation in the rate at which fluid is ported by said first control valve means when said first control valve means is in the second condition to thereby effect a variation in the rate at which said first actuator means decreases the displacement of said pump unit of said hydrostatic transmission, a second pilot valve member movable between first and second positions, and means for moving said second pilot valve member from its first position to its second position to effect operation of said first control valve means from the neutral condition to the second condition and for moving said second pilot valve member from its first position to its second position to effect a variation in the rate at which fluid is ported by said first control valve means when said first control valve means is in the first condition to thereby effect a variation in the rate at which said first actuator means increases the displacement of said pump unit of said hydrostatic transmission.

16. An apparatus as set forth in claim 15 further including second actuator means for varying the displacement of said motor unit, second control valve means for porting fluid to effect operation of said second actuator means to vary the displacement of said motor unit of said hydrostatic transmission, said second control valve means being operable from a neutral condition to a first condition to effect operation of said second actuator means to increase the displacement of said motor unit of said hydrostatic transmission and being operable from the neutral condition to a second condition to effect operation of said second actuator means to decrease the displacement of said motor unit of said hydrostatic transmission, a third pilot valve member movable between first and second positions, means for moving said third pilot valve member from its first position to its second position to effect operation of said second control valve means from its neutral condition to its first condition and for moving said third pilot valve member from its first position to its second position to effect a variation in the rate at which fluid is ported by said second control valve means when said second control valve means is in its second condition to thereby effect a variation in the rate at which said second actuator means decreases the displacement of said motor unit of said hydrostatic transmission, a fourth pilot valve member movable between first and second positions and means for moving said fourth pilot valve member from its first position to its second position to effect operation of said second control valve means from its neutral condition to its second condition and for moving said fourth pilot valve member from its first position to its second position to effect a variation in the rate at which fluid is ported by said second control valve means when said second control valve means is in its first condition to thereby effect a variation in the rate at which said second actuator means increases the displacement of said motor unit of said hydrostatic transmission.

17. An apparatus as set forth in claim 16 further including first passage means for conducting fluid between said first actuator means and said first pilot valve member when said first control valve means is in its second condition, said first pilot valve member being movable from its first position retarding fluid flow through said first passage means to its second position promoting fluid flow through said first passage means to thereby effect a variation in the rate at which fluid is ported by said first control valve means when said first control valve means is in its second condition, second passage means for conducting fluid between said first actuator means and said second pilot valve member when said first control valve means is in its first condition, said second pilot valve member being movable from its first position retarding fluid flow through said second passage means to its second position promoting fluid flow through said second passage means to thereby effect a variation in the rate at which fluid is ported by said first control valve means when said first control valve means is in its first condition, third passage means for conducting fluid between said second actuator means and said third pilot valve member when said second control valve means is in its second condition, said third pilot valve member being movable from its first position retarding fluid flow through said third passage means to its second position promoting fluid flow through said first passage means to thereby effect a variation in the rate at which fluid is ported by said second control valve means when said second control valve means is in its second condition, fourth passage means for conducting fluid between said second actuator means and said fourth pilot valve member when said second control valve means is in its first condition, said fourth pilot valve member being movable from its first position retarding fluid flow through said fourth passage means to its second position promoting fluid flow through said fourth passage means to thereby effect a variation in the rate at which fluid is ported by said second control valve means when said second control valve means is in its first condition.

18. An apparatus as set forth in claim 17 further including means for preventing movement of said first pilot valve member from its first position to its second position for a predetermined time period after initiation of movement of said second pilot valve member from its first position to its second position and for preventing movement of said second pilot valve member from its first position to its second position for a predetermined time period after initiation of movement of said first pilot valve member from its first position to its second position, means for preventing movement of said third pilot valve member from its first position to its second position for a predetermined time period after initiation of operation of said fourth pilot valve member from its first position to its second position and for preventing movement of said fourth pilot valve member from its first position to its second position for a predetermined time period after initiation of operation of said third pilot valve member from its first position to its second position.

19. An apparatus comprising a hydrostatic transmission including a pump unit connected in fluid communication with a motor unit, actuator means operable under the influence of fluid pressure to vary the displacement of one of said units from an initial displacement to a selected operating displacement, a pump for supplying fluid under pressure, a control valve connected in fluid communication with said pump and said actuator means, said control valve being operable between a first condition preventing fluid flow between said pump and said actuator means and a second condition porting fluid under pressure from said pump to said actuator means to effect operation of said actuator means to vary the displacement of said one unit from the initial displacement to the selected operating displacement, and secondary valve means for porting fluid under pressure to effect operation of said actuator means to change the displacement of said one unit from the selected displacement to the initial displacement upon a failure of said pump to supply fluid under pressure to said control valve.

20. An apparatus as set forth in claim 19 further including pressure chamber means communicating with said pump for effecting operation of said secondary valve means from a closed condition blocking fluid flow to an open condition enabling fluid to flow from said actuator means through said secondary valve means in response to a failure of said pump to supply fluid under pressure.

21. An apparatus as set forth in claim 19 wherein said actuator means includes first and second actuators and said apparatus further including first conduit means for conducting fluid from said control valve to said first actuator, and second conduit means for conducting fluid from said second actuator to said control valve, said secondary control valve means being operable to connect said first and second conduit means in fluid communication upon a failure of said pump.

22. An apparatus as set forth in claim 19 wherein said control valve is operable from said first condition to said second condition to effect operation of said actuator means to increase the displacement of said one unit of said hydrostatic transmission and being operable from said first condition to a third condition to effect operation of said actuator means to decrease the displacement of said one unit of said hydrostatic transmission, said apparatus further including first pilot valve means for effecting operation of said control valve from the first condition to the second condition and for effecting a variation in the rate at which fluid is ported by said control valve independently of said control valve when said control valve is in the third condition to thereby effect a variation in the rate at which said actuator means decreases the displacement of said pump unit of said hydrostatic transmission, and second pilot valve means for effecting operation of said control valve from the first condition to the third condition and for effecting a variation in the rate at which fluid is ported by said control valve independently of said control valve when said control valve is in the second condition to thereby effect a variation in the rate at which said actuator means increases the displacement of said pump unit of said hydrostatic transmission.

23. An apparatus as set forth in claim 22 further including first passage means for conducting fluid between said actuator means and said first pilot valve means when said control valve is in the third condition, said first pilot valve means being operable from a first condition retarding fluid flow through said first passage means to a second condition promoting fluid flow through said first passage means to thereby effect a variation in the rate at which fluid is ported by said control valve when said control valve is in its third condition, second passage means for conducting fluid between said actuator means and said second pilot valve means when said control valve is in the second condition, said second pilot valve means being operable from a first condition retarding fluid flow through said second passage means to a second condition promoting fluid flow through said second passage means to thereby effect a variation in the rate at which fluid is ported by said control valve when said control valve is in its second condition.

24. An apparatus as set forth in claim 23 further including means for preventing operation of said first pilot valve means from its first condition to its second condition for a predetermined time period after initiation of operation of said second pilot valve means from its first condition to its second condition and for preventing operation of said second pilot valve means from its first condition to its second condition for a predetermined time period after initiation of operation of said first pilot valve means from its first condition to its second condition.

25. An apparatus as set forth in claim 5 wherein said means for effecting actuation of said first pilot valve means further effects operation of said second pilot valve means to provide a relatively low rate at which fluid is ported by said main control valve means when said first output signal indicates that the displacement of said one unit is less than the selected displacement by an amount which is less than said first predetermined amount, and said means for effecting actuation of said second pilot valve means further effects operation of said first pilot valve means to provide a relatively low rate at which fluid is ported by said main control valve means when said second output signal indicates that the displacement of said one unit exceeds the selected displacement by an amount which is less than said second predetermined amount.

26. An apparatus as set forth in claim 25 wherein said means for effecting actuation of said pilot valve means effects operation of said main control valve means to the neutral condition when said output signals indicate that the displacement of said one unit closely approximates the selected displacement.

27. An apparatus as set forth in claim 7 wherein said main control valve means blocks fluid flow from said actuator means when said main control valve member is in said neutral position.

28. An apparatus as set forth in claim 11 further including a reservoir of fluid, pump means for pressurizing said fluid above the pressure of said fluid in said reservoir, third passage means for connecting said first and second pressure chamber means in fluid communication with said pressurized fluid from said pump means, means restricting the flow of fluid through said third passage means, fourth passage means connecting said first pressure chamber means in fluid communication with said reservoir, fifth passage means connecting said second pressure chamber means in fluid communication with said reservoir, and means restricting the flow of fluid through said fourth and fifth passage means to a degree greater than the restriction in said third passage means to retain pressurized fluid in said first and second pressure chamber means.

29. An apparatus as set forth in claim 7 further including means for manually moving said main valve member to anyone of said main valve members positions.

30. An apparatus as set forth in claim 4 further including means for providing an electrical output signal which indicates that the displacement of said one unit is the same as the selected displacement upon the loss of either said first or second electrical signal.

31. An apparatus as set forth in claim 4 further including means for adjusting said first electrical signal to correspond to said second electrical signal when said displacement of said one unit corresponds to said selected displacement.

32. An apparatus as set forth in claim 4 further including means to provide an output signal which indicates that said displacement of said one unit is the same as the selected displacement when said first electrical signal closely approximates said second electrical signal to provide a dead zone in the operation of said main control valve means.

* * * * *

UNITED STATES PATENT AND TRADEMARK OFFICE
CERTIFICATE OF CORRECTION

PATENT NO. : 3,924,410
DATED : 12/9/75
INVENTOR(S) : Charles R. Cornell; Dennis D. Simpson; Kenneth K. Knapp It is certified that error appears in the above-identified patent and that said Letters Patent are hereby corrected as shown below:

Col. 7, line 38:  After "169" add: "or the spring 170".

Col. 10, line 13:  "The", first occurrence, should read "This".

Col. 20, lines 40, 41:  Delete the word "negative" in both lines.

Signed and Sealed this second Day of March 1976

[SEAL]

Attest:

RUTH C. MASON
*Attesting Officer*

C. MARSHALL DANN
*Commissioner of Patents and Trademarks*